United States Patent [19]

Joby

[11] 4,251,873
[45] Feb. 17, 1981

[54] DIGITAL COMPUTING APPARATUS PARTICULARLY FOR CONTROLLING A GAS TURBINE ENGINE

[75] Inventor: Michael J. Joby, Solihull, England

[73] Assignee: Lucas Industries Limited, Birmingham, England

[21] Appl. No.: 29,349

[22] Filed: Apr. 12, 1979

[30] Foreign Application Priority Data

Apr. 14, 1978 [GB] United Kingdom ............... 14678/78

[51] Int. Cl.³ ...................... G06F 11/20; G06F 15/16
[52] U.S. Cl. .................................... 364/741; 364/119; 371/9; 371/16; 371/68
[58] Field of Search .................... 364/119, 741; 371/9, 371/16, 68; 235/307; 340/146.1 BE; 318/564

[56] References Cited

U.S. PATENT DOCUMENTS

| 3,618,015 | 11/1971 | Homonick | 340/146.1 BE |
| 3,681,578 | 8/1972 | Stevens | 235/307 X |
| 3,829,668 | 8/1974 | Noumi et al. | 364/741 X |
| 3,931,505 | 1/1976 | Sevcik | 235/307 |

FOREIGN PATENT DOCUMENTS

| 1181182 | 2/1970 | United Kingdom | 371/9 |
| 1238162 | 7/1971 | United Kingdom | 371/9 |
| 1359748 | 7/1974 | United Kingdom | 371/9 |
| 1444513 | 8/1976 | United Kingdom | 371/9 |
| 1483733 | 8/1977 | United Kingdom | 371/9 |

*Primary Examiner*—Jerry Smith

[57] ABSTRACT

A digital computing apparatus, particularly for use in controlling a gas turbine engine, comprises two identical computing devices each of which is responsive to identical time control signals and to identical input signals, so as to supply nominally identical synchronized output signals, the sequential bits of which one output signal is comprised being compared, one at a time, with the corresponding bits of the other output signals, to provide monitoring of operation of both devices.

5 Claims, 5 Drawing Figures

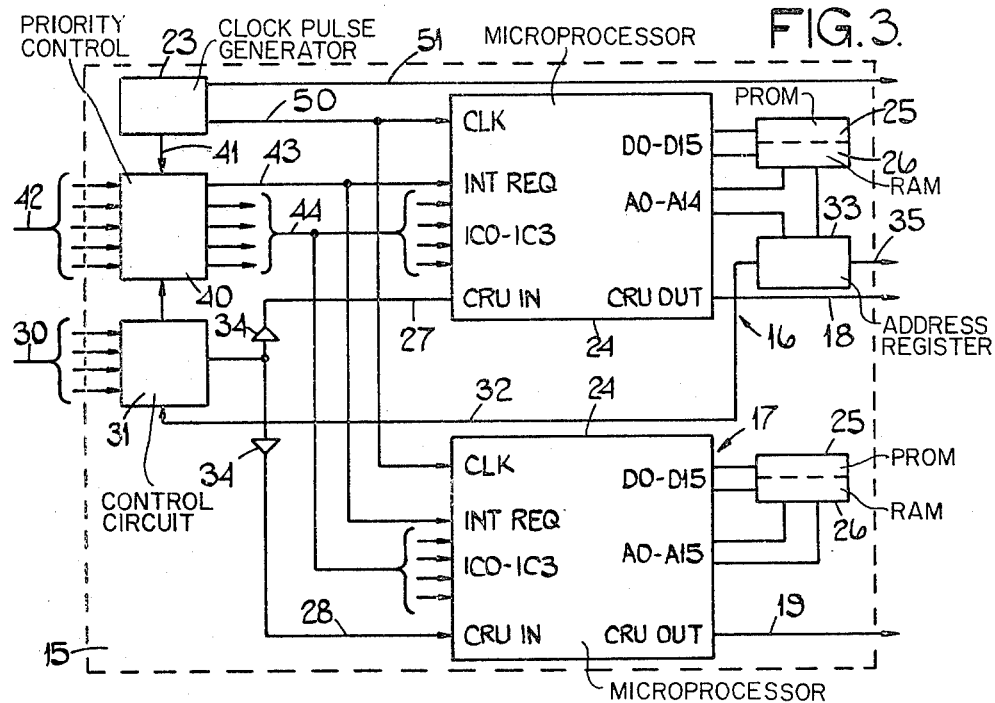
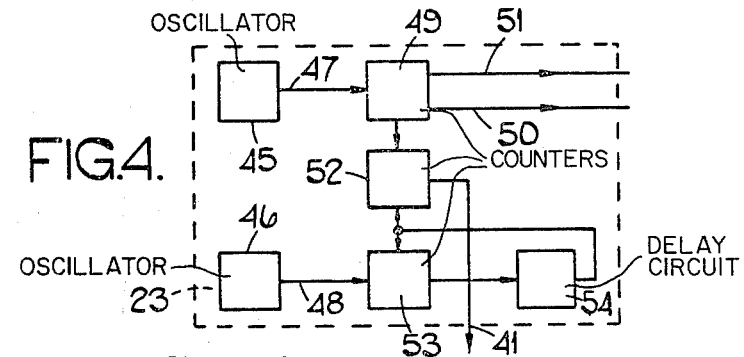
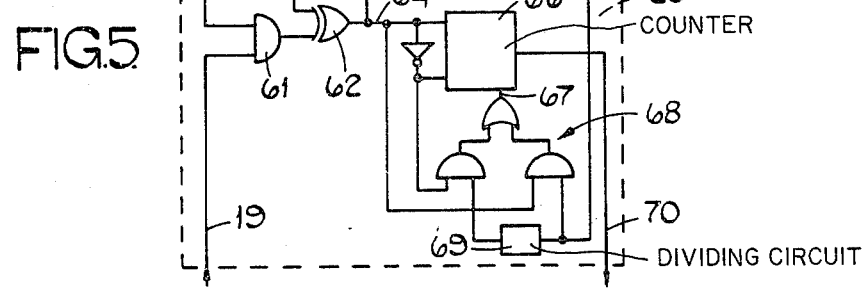

DIGITAL COMPUTING APPARATUS PARTICULARLY FOR CONTROLLING A GAS TURBINE ENGINE

This invention relates to digital computing apparatus and methods for checking its operation.

It is becoming increasingly common to control systems and processes by means of digital computing apparatus. Though it may be expected that malfunction of a digital computing device per se will result in catastrophic, and therefore readily detectable, degradation of the data or control signals supplied by the device, it cannot be assumed that this will always be so. Account must therefore be taken of the possibility that such malfunctions may result in the production of erroneous output signals whose display or control functions may continue to be regarded as acceptable. It is thus necessary to provide some means of checking the operation of digital control apparatus so that a control system ceases to be responsive to data produced as a result of the malfunction.

It is known to program digital computers to monitor their own store contents and operations. However, an adequate level of this type of software monitoring will occupy more computer time than that taken by the primary control function. The present invention provides a self-checking digital computing apparatus, and a method of checking the operation of a digital computing device by comparing, on a bit-by-bit basis, its output with that of an identical device. Bit-by-bit comparison is to be understood as a method in which the sequential bits of which one output signal is comprised are compared, one at a time, with corresponding bits of which another, nominally identical, output signal is comprised. Bit-by-bit comparison may be expected to involve less hardware than other forms of comparison, and thereby to improve the reliability of the comparison method and equipment.

According to one aspect of the invention a digital computing apparatus comprises a first arrangement of two identical digital computing devices each of which is responsive to time control signals and each of which includes means for providing output signals in serial form, said arrangement further comprising means for supplying nominally identical input signals to said devices, means for supplying synchronised time control signals to said devices, and means for comparing said output signals on a bit-by-bit basis and for providing a signal indicative of a lack of correspondence between said output signals.

According to another aspect of the invention a method of checking the operation of a first digital computing device which is responsive to input signals to provide output signals in serial form, comprises providing a second digital computing device identical with said first device and responsive to said input signals, and comparing the output signals from said devices on a bit-by-bit basis.

An embodiment of the invention, as applied to control of a gas turbine engine, will now be described by way of example only and with reference to the accompanying drawings in which:

FIG. 3 shows, in greater detail, a computer arrangement forming part of FIG. 2,

FIG. 4 shows a clock pulse generating arrangement forming part of FIG. 3, and

FIG. 5 is a diagram of a comparator circuit forming part of FIG. 2.

Figure 1:
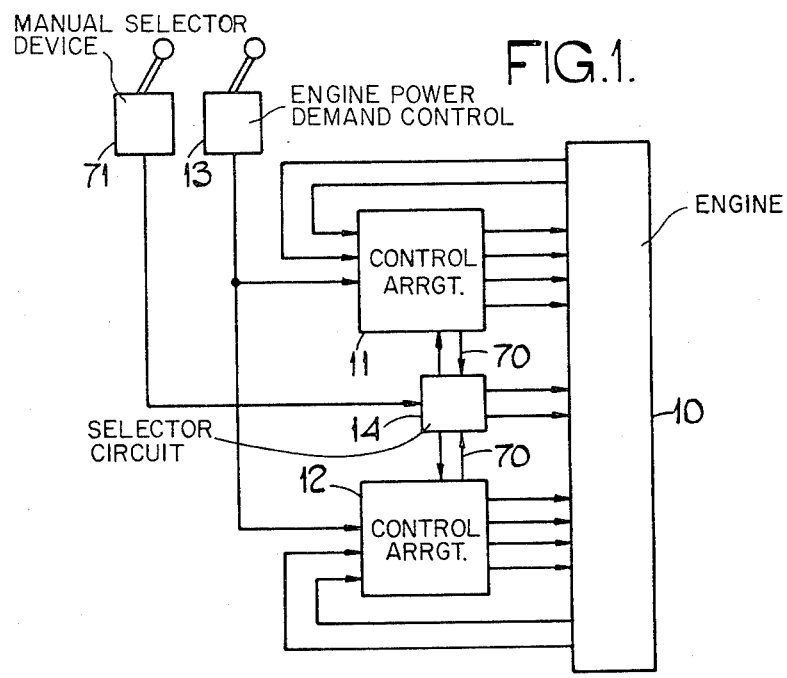
FIG. 1 shows, diagrammatically, an engine having duplicated control lanes.

As shown in FIG. 1 a gas turbine engine and its associated fuel control and indicator devices is indicated generally at 10. The engine 10 is responsive to signals from a selected one of two identical control arrangements 11, 12. The control arrangements 11, 12 are responsive to signals from an engine power demand control 13 and to input signals, as for example engine shaft speed, compressor delivery pressure and engine temperatures, to provide output signals which control fuel metering devices and the positions of inlet guide vanes on the engine. A selector circuit 14 is responsive to a malfunction of one of the control arrangements 11, 12 to inhibit flow of control signals to the engine 10 from that arrangement, and to place the engine 10 under control of the other of the arrangements.

Figure 2:
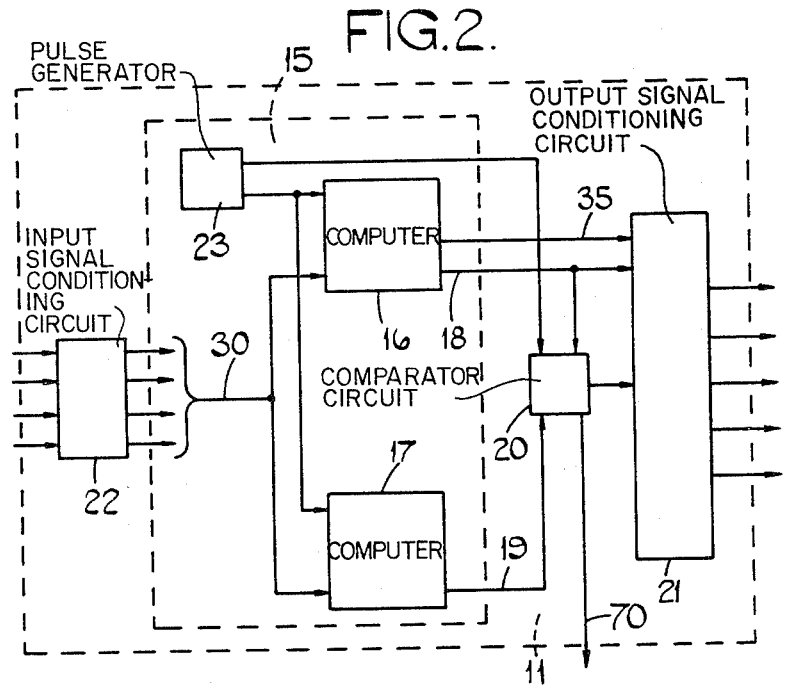
FIGS. 2 shows, diagrammatically, one of the control lanes of FIG. 1.

As shown in FIG. 2 the control arrangement 11 includes a computer arrangement which includes two identical digital computers 16, 17 which include means for providing output signals in serial form on respective lines 18, 19. The control arrangement 11 also includes a comparator circuit 20, later to be described in detail, which is responsive to the signals on the lines 18, 19. Signals on the line 18 pass to an output signal conditioning circuit 21, which may include storage registers, digital to analog converters and power amplifiers, and which supplies the conditioned signals to the engine 10. The computers 16, 17 are responsive to input signals from an input signal conditioning circuit 22 which may include analog to digital converters and storage registers. Both of the computers 16, 17 are responsive to clock signals from a single clock pulse generating arrangement 23, shown in more detail in FIG. 4.

As shown in FIG. 3 each of the identical computers 16, 17 comprises a micro-processor 24, a programmable read only memory 25 and a random access memory 26. The micro-processors 24 are Texas Instruments S.B.P. 9900 devices which include input/output registers so that output signals on the respective lines 18, 19 are supplied in serial form. The micro-processors 24 are also responsive to serial input signals on respective lines 27, 28. Signals on lines 30 from the input signal conditioning circuit 22 (FIG. 2) are supplied to the input lines 27, 28 through a control circuit 31 having a plurality of input gates which are selectively addressable by means of signals on lines 32 from an address register 33. The register 33 is itself addressable by the micro-processor 24 of the computer 16. The input lines 27, 28 are mutually isolated by buffers 34 so that a malfunction in one of the micro-processors 24 does not adversely affect the other of the micro-processors. The register 33 may also provide address information on lines 35, to output gates in the output signal conditioning circuit 21.

The micro-processors 24, are responsive to interrupt signals from a priority control circuit 40. The circuit 40 is responsive to interrupt signals on a line 41 from the clock pulse generator 23 to the present of input data signals on the lines 30, and to the presence of engine test signals on a plurality of lines 42. The circuit 40 can provide an interrupte requirement signal on a line 43, together with signals on lines 44 indicative of the nature of the interrupt. The circuit 40 selects the priority in which signals are supplied to the processors 24.

As shown in FIG. 4 the clock pulse generator arrangement 23 comprises two identical crystal controlled oscillators 45, 46 which provide output signals of 6 MHz on respective lines 47, 48. A counter device 49 provides, on a line 50, a pulse which is responsive to every third pulse of the signal on line 47, that is the frequency of the signal on line 50 is 2 MHz, the pulses on the line 50 providing clock pulses for the processors 24 (FIG. 3). The device 23 also provides, on a line 51, a 2 MHz train of strobe pulses which are in synchronism with the clock pulses on line 50 but which start and finish well within the duration of the clock pulses on the line 50. The counter 49 also provides a signal to a further counter device 52 which supplied a 100 Hz output on the line 41 to the interrupt priority control circuit 40 (FIG. 3). A further counter device 53 is responsive to the 6 MHz signal on line 48 to provide a 100 Hz signal to a delay circuit 54. The leading edges of the delayed 100 Hz pulses from circuit 54 are used to reset the counter devices 52, 53. When the output frequencies of the oscillators 45, 46 exactly coincide the duration of the pulses on the line 41 will be that of the delay imposed by the circuit 54. The signals on lines 41 provide, via the priority control circuit 40, interrupt signals to the processors 24. The processors 24 are programmed so as to allow interrupt signals of the duration set by the delay circuit 54. Should the frequency of the signals from oscillator 46 fall below those from oscillator 45 the resultant additional delays will cause an increase in the duration of the signals on line 41, and when these durations exceed the interrupt periods allowed by the program, the resultant series of unallowable interrupts will provide an indication of a malfunction within the clock pulse generator arrangement 23.

Conversely, should the frequency of the signals from oscillator 46 exceed those from oscillator 45, the duration of the pulses on line 41 will decrease, and at a predetermined level of difference in the oscillator frequencies the pulses on line 41 will disappear. The absence of an interrupt signal during the allowable interrupt period may, once again, readily be detected. The duration of the delay imposed by the circuit 54, together with the allowable interrupt period defined by the program, thus sets the tolerance on the allowable difference between the frequencies of the oscillators 45, 46.

As shown in FIG. 5 the comparator circuit 20 is responsive to the successive bits of output signals on the lines 18, 19 from the respective processors 24. These bits are supplied one at a time through respective AND gates 60, 61 under control of the strobe pulses on line 51. Both the gated signals provide the inputs to an exclusive OR gate 62. The outputs from gates 60, 62 provide the inputs of a further AND gate 63. The gates 62, 63 provide, on respective lines 64, 65 signals which indicate the correspondence, or otherwise, of the bits on lines 18, 19. The arrangement is such that correspondence of a bit on line 18 with a bit on line 19 causes the outputs on lines 64, 65 to be in a first logical state, and non-correspondence causes these outputs to be in a second logical state.

Control of the comparator circuit 20 by the strobe signals on line 51 ensures that the successive bits of the output signals on line 18, 19 are gated for periods which start after the times when the bits appear on lines 18, 19 and which end before these bits disappear, thereby ensuring that a false lack of correspondence signal is not generated as a result of slight variations in timing between the output signals on lines 18, 19.

A counter 66 counts up or down respectively in response to the second or first logical states of the signals on line 64. These counting operations are controlled by pulses on a line 67, derived from the strobe pulses on line 51. The pulses on line 67 are derived by means of a logic circuit 68 having a dividing circuit 69 which may be a counter similar to the counter 49 previously described with reference to FIG. 4. The arrangement is such that the counter 66 counts up in response to every second (non-correspondence) signal, but counts down only in response to a sub-multiple of the first (correspondence) signals on line 64, this sub-multiple being determined by the dividing factor of the circuit 69. At a predetermined threshold of the count in counter 66 an indicating signal is provided on a line 70. Every non-correspondence signal on line 64 thus requires several correspondence signals to return the value in counter 66 to its previous level.

Both of the control arrangements 11, 12 will normally be in operation, and the selector circuit 14 (FIG. 1) may be set manually by means of a device 71 to allow control signals from a selected one of the arrangements 11, 12 to be supplied to the engine 10. The selector circuit 14 is responsive to indicating signals on the lines 70, from the comparator circuits 20 in the respective control arrangements 11, 12 and as previously described, inhibits signals to the engine 10 from a control arrangement which provides a malfunction signal on a line 70.

If a malfunction signal is present on a line 70 from the one of the arrangements 11, 12 which is currently controlling the engine 10, the selector circuit 14 also allows control signals to pass to the engine 10 from the other of the control arrangements. If a malfunction signal originates in the non-controlling one of the arrangements 11, 12 there will, of course, be no transfer of control. In either case, however, the circuit 14 provides a malfunction indication on an appropriate indicator device on the engine 10.

I claim:

1. A digital computing apparatus comprising a first arrangement of two identical digital computing devices each of which is responsive to time control signals and each of which includes means for providing output signals in serial form, said arrangement further comprising means for supplying nominally identical input signals to said devices, means for comparing said output signals on a bit-by-bit basis and for providing a signal indicative of a lack of correspondence between said output signals, and means for supply synchronised time control signals to said devices, including a pair of oscillators for providing pulsed outputs of nominally identical frequencies, means responsive to the output pulses of one of said oscillators for generating interrupt signals, and delay means responsive to the output pulses of the other of said oscillators for resetting said interrupt signal generating means, whereby the durations of said interrupt signals are dependent on correspondence between said output frequencies, said apparatus including means responsive to unacceptable durations of said interrupt signals for providing a malfunction indication.

2. An apparatus as claimed in claim 1 in which said means for comparing said output signals comprises means for counting in a first sense at a first rate in response to non-correspondence between said output signals, said counting means including means for providing said indicative signal when the count in said first sense reaches a predetermined value.

3. An apparatus as claimed in claim 2 in which said counting means is operable to count in a second sense at a second, slower rate in response to correspondence between said output signals.

4. An apparatus as claimed in claim 2 or claim 3 which includes means for gating successive bits of said output signals to said comparing means for periods which commence after the respective bits have appeared in said output signals and which end before the respective bits disappear from said output signals.

5. An apparatus as claimed in claim 1 which includes a second arrangement corresponding to said first arrangement, and a selector circuit responsive to said indicative signal from one of said arrangements, for inhibiting the supply of output signals from said one arrangement to an external apparatus, and for causing output signals from the other of said arrangements to pass to said external apparatus.

* * * * *